US010671568B2

(12) United States Patent
Roomp et al.

(10) Patent No.: US 10,671,568 B2
(45) Date of Patent: Jun. 2, 2020

(54) DE-DUPLICATING ATTACHMENTS ON MESSAGE DELIVERY AND AUTOMATED REPAIR OF ATTACHMENTS

(71) Applicant: MICROSOFT TECHNOLOGY LICENSING, LLC, Redmond, WA (US)

(72) Inventors: Kristof Roomp, Mira-sol (ES); Gruia Pitigoi-Aron, San Jose, CA (US); Ivaylo Dimitrov, Mountain View, CA (US); Brandon Pai, Mountain View, CA (US); Cheng Ho, Santa Clara, CA (US); Kumar Pasumarthy, Sunnyvale, CA (US); Lincoln Liu, San Jose, CA (US); Alok Dhariwal, Sunnyvale, CA (US); John Rodrigues, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 274 days.

(21) Appl. No.: 15/004,999

(22) Filed: Jan. 24, 2016

(65) Prior Publication Data
US 2016/0140138 A1    May 19, 2016

Related U.S. Application Data

(63) Continuation of application No. 13/572,900, filed on Aug. 13, 2012, now Pat. No. 9,262,429.

(51) Int. Cl.
G06F 7/00      (2006.01)
G06F 17/00     (2019.01)
(Continued)

(52) U.S. Cl.
CPC ........ *G06F 16/1748* (2019.01); *G06F 16/137* (2019.01); *G06F 16/2365* (2019.01); *H04L 51/08* (2013.01)

(58) Field of Classification Search
CPC ........... G06F 17/3053; G06F 17/30386; G06F 17/30864; G06F 17/30594; G06Q 30/02
See application file for complete search history.

(56) References Cited

U.S. PATENT DOCUMENTS 6,611,842 B1 *  8/2003  Brown ................. G06Q 30/02
6,625,595 B1 *  9/2003  Anderson ........... G06F 17/3061
(Continued)

FOREIGN PATENT DOCUMENTS

CN      101411144 A      4/2009
JP      2003223404 A     8/2003
(Continued)

OTHER PUBLICATIONS

"Second Office Action Issued in Chinese Patent Application No. 201380043316.2", dated Sep. 30, 2017, 6 Pages.
(Continued)

*Primary Examiner* — Hosain T Alam
*Assistant Examiner* — Nicholas Allen

(57) ABSTRACT

Systems and techniques of de-duplicating file and/or blobs within a file system are presented. In one embodiment, an email system is disclosed wherein the email system receives email messages comprising a set of associated attachments. The system determines whether the associated attachments have been previously stored in the email system, the state of the stored attachment, and if the state of the attachment is appropriate for sharing copies of the attachment, then providing a reference to the attachment upon a request to share the attachment. In another embodiment, the system may detect whether stored attachments are corrupted and, if so,
(Continued)

attempt to repair the attachment, and possibly, prior to sharing references to the attachment.

20 Claims, 3 Drawing Sheets

(51) Int. Cl.
| | |
|---|---|
| *G06F 16/174* | (2019.01) |
| *G06F 16/13* | (2019.01) |
| *G06F 16/23* | (2019.01) |
| *H04L 12/58* | (2006.01) |

(56) References Cited

U.S. PATENT DOCUMENTS

| | | | |
|---|---|---|---|
| 6,636,853 B1* | 10/2003 | Stephens, Jr. | G06F 17/30696 |
| 6,735,770 B1* | 5/2004 | Yeager | G06F 9/546 |
| | | | 718/107 |
| 7,003,551 B2 | 2/2006 | Malik | |
| 7,251,680 B2* | 7/2007 | DeVos | H04L 51/08 |
| | | | 709/206 |
| 7,472,242 B1 | 12/2008 | Deshmukh et al. | |
| 7,539,704 B2* | 5/2009 | Brodersen | G06F 17/30174 |
| 7,831,676 B1* | 11/2010 | Nagar | G06Q 10/107 |
| | | | 709/203 |
| 7,870,089 B1* | 1/2011 | Hall | H04L 51/08 |
| | | | 705/50 |
| 7,913,114 B2 | 3/2011 | Leppard | |
| 7,996,371 B1* | 8/2011 | Deshmukh | G06F 17/30156 |
| | | | 707/692 |
| 8,073,822 B2 | 12/2011 | Sell et al. | |
| 8,209,506 B2* | 6/2012 | Yueh | G06F 3/0608 |
| | | | 707/664 |
| 8,233,594 B2* | 7/2012 | Vaghar | H04M 3/5307 |
| | | | 379/88.18 |
| 8,234,468 B1* | 7/2012 | Deshmukh | G06F 11/1453 |
| | | | 711/162 |
| 8,447,741 B2* | 5/2013 | Reiter | G06F 11/1453 |
| | | | 707/692 |
| 8,459,245 B1* | 6/2013 | Fiorill | F41B 11/53 |
| | | | 124/51.1 |
| 8,484,162 B2* | 7/2013 | Prahlad | G06F 11/1453 |
| | | | 707/640 |
| 8,495,028 B2* | 7/2013 | Reiter | G06F 11/1453 |
| | | | 707/687 |
| 8,650,228 B2* | 2/2014 | Wideman | G06F 17/30138 |
| | | | 707/813 |
| 2001/0054073 A1 | 12/2001 | Ruppert et al. | |
| 2002/0152224 A1* | 10/2002 | Roth | H04N 5/44543 |
| 2003/0004922 A1* | 1/2003 | Schmidt | G06F 17/30286 |
| 2003/0105716 A1 | 6/2003 | Sutton et al. | |
| 2004/0162853 A1* | 8/2004 | Brodersen | G06F 17/30174 |
| 2007/0274519 A1* | 11/2007 | Cohen | G11B 27/034 |
| | | | 380/201 |
| 2008/0033905 A1* | 2/2008 | Stokes | G06Q 10/06 |
| 2008/0052324 A1 | 2/2008 | Choubey et al. | |
| 2008/0086640 A1* | 4/2008 | Voss | H04L 12/58 |
| | | | 713/171 |
| 2008/0317068 A1* | 12/2008 | Sagar | G06F 17/30174 |
| | | | 370/503 |
| 2009/0204636 A1* | 8/2009 | Li | G06F 17/30097 |
| 2009/0222450 A1* | 9/2009 | Zigelman | H04L 67/06 |
| 2009/0259701 A1* | 10/2009 | Wideman | G06F 17/30138 |
| 2009/0319585 A1* | 12/2009 | Gokhale | G06F 17/30902 |
| 2009/0319618 A1* | 12/2009 | Affronti | G06Q 10/107 |
| | | | 709/206 |
| 2010/0031086 A1 | 2/2010 | Leppard | |
| 2010/0161608 A1 | 6/2010 | Jain et al. | |
| 2010/0223495 A1* | 9/2010 | Leppard | G06F 11/004 |
| | | | 714/6.11 |
| 2010/0235332 A1* | 9/2010 | Haustein | G06F 17/30315 |
| | | | 707/692 |
| 2010/0332401 A1 | 12/2010 | Prahlad et al. | |
| 2010/0332454 A1* | 12/2010 | Prahlad | G06F 17/3002 |
| | | | 707/654 |
| 2011/0016091 A1* | 1/2011 | Prahlad | G06F 11/1453 |
| | | | 707/654 |
| 2011/0099154 A1* | 4/2011 | Maydew | G06F 17/30156 |
| | | | 707/692 |
| 2011/0099200 A1* | 4/2011 | Blount | G06F 21/32 |
| | | | 707/770 |
| 2011/0191851 A1* | 8/2011 | Largman | G06F 11/1417 |
| | | | 726/24 |
| 2011/0196831 A1* | 8/2011 | Zunger | G06F 17/30215 |
| | | | 707/634 |
| 2011/0196833 A1* | 8/2011 | Drobychev | G06F 17/30575 |
| | | | 707/634 |
| 2011/0196900 A1* | 8/2011 | Drobychev | G06F 17/30575 |
| | | | 707/812 |
| 2011/0218973 A1* | 9/2011 | Pendlebury | G06F 17/30156 |
| | | | 707/692 |
| 2011/0231362 A1* | 9/2011 | Attarde | G06F 11/3442 |
| | | | 707/609 |
| 2012/0089651 A1* | 4/2012 | Hahn | G06F 17/30147 |
| | | | 707/822 |
| 2012/0131433 A1 | 5/2012 | Tiwari et al. | |
| 2012/0137054 A1* | 5/2012 | Sadri | G06F 3/0641 |
| | | | 711/103 |
| 2012/0158672 A1* | 6/2012 | Oltean | G06F 17/30091 |
| | | | 707/692 |
| 2012/0166401 A1* | 6/2012 | Li | G06F 17/3033 |
| | | | 707/692 |
| 2012/0173919 A1* | 7/2012 | Patel | G06F 11/1453 |
| | | | 714/4.11 |
| 2012/0179656 A1* | 7/2012 | Bunte | G06F 11/1451 |
| | | | 707/667 |
| 2013/0046832 A1* | 2/2013 | Wideman | H04L 51/12 |
| | | | 709/206 |
| 2013/0290280 A1* | 10/2013 | Prahlad | G06F 11/1453 |
| | | | 707/692 |
| 2013/0318054 A1* | 11/2013 | Scholtes | G06F 17/30011 |
| | | | 707/692 |

FOREIGN PATENT DOCUMENTS

| | | |
|---|---|---|
| JP | 2006268329 A | 10/2006 |
| JP | 2012093827 A | 5/2012 |
| KR | 101035302 B1 | 5/2011 |
| WO | 2008000532 A1 | 1/2008 |

OTHER PUBLICATIONS

"Office Action Issued in European Patent Application No. 13753922.7", dated Jun. 18, 2018, 6 Pages.

"Final Office Action Issued in U.S. Appl. No. 13/572,900", dated May 15, 2015, 11 Pages.

"Non-Final Office Action Issued in U.S. Appl. No. 13/572,900", dated Sep. 11, 2014, 18 Pages.

"Notice of Allowance Issued in U.S. Appl. No. 13/572,900", dated Oct. 5, 2015, 9 Pages.

Li, et al., "An Email Server Optimized for Storage Issues", In Proceedings of the IEEE 10th International Conference on Trust, Security and Privacy in Computing and Communications, Nov. 16, 2011, pp. 1437-1443.

"International Search Report and Written Opinion Issued in PCT Application No. PCT/US2013/053678", dated Dec. 6, 2013, 10 Pages.

Sun, et al., "A Clustering Based Fast Detection Algorithm for Large Scale Duplicate Emails", In Proceedings of the 9th International Conference on Machine Learning and Cybernetics, Jul. 11, 2010, pp. 3270-3274.

"Office Action Issued in Korean Patent Application No. 10-2015-7003876", dated Aug. 13, 2019, 17 Pages.

"First Office Action and Search Report Issued in Chinese Patent Application No. 201380043316.2", dated Mar. 2, 2017, 13 Pages.

(56) References Cited

OTHER PUBLICATIONS

"Office Action Issued in Japanese Patent Application No. 2015-526613", dated Jun. 22, 2017, 13 Pages.

* cited by examiner

DE-DUPLICATING ATTACHMENTS ON MESSAGE DELIVERY AND AUTOMATED REPAIR OF ATTACHMENTS

CROSS-REFERENCE TO RELATED APPLICATIONS

The present application is a continuation of U.S. patent application Ser. No. 13/572,900 filed on 13 Aug. 2012 and claims priority to and benefit thereof and is incorporated by reference in its entirety.

BACKGROUND

In the area of database and memory management, it may be desirable to reduce the number of duplicate files (called "blobs")—within a given computer, within a number of computers, or across a computing and networked environment. To automate such a process, the computer or environment needs to identify these blobs and take appropriate action thereafter.

The effort to avoid duplicate files is rewarded with a concomitant savings in disk space, I/O and network bandwidth savings. Thus, it may be desirable to accurately and efficiently handle and manage duplicate files.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

Systems and techniques of de-duplicating file and/or blobs within a file system are presented. In one embodiment, an email system is disclosed wherein the email system receives email messages comprising a set of associated attachments. The system determines whether the associated attachments have been previously stored in the email system, the state of the stored attachment, and if the state of the attachment is appropriate for sharing copies of the attachment, then providing a reference to the attachment upon a request to share the attachment. In another embodiment, the system may detect whether stored attachments are corrupted and, if so, attempt to repair the attachment, and possibly, prior to sharing references to the attachment.

In one embodiment, a method for de-duplicating data in a file system is disclosed, where the file system comprising one or more files, each file may comprise a set of data and the set of data capable of being shared by two or more users. The method may comprise the following steps: receiving a file to be stored within a file system; checking whether a set of data within said file has been previously stored in said file system; if said set of data has been stored in said file system, checking the state of the stored set of data; and if said state of stored set of data is appropriate for sharing copies of said file, then providing a reference to said file upon a command to share said set of data.

In another embodiment, a system for de-duplicating data in an email system is disclosed where the system may comprises: an email server, said email server in communication with a set of email clients; a database for storing emails and associated attachments; said database storing at least one of group, said group comprising: the email message, associated attachments, metadata regarding the email message and metadata regarding said associated attachments; a module for managing the sharing of attachments between said set of email clients; and further wherein said module of managing the sharing of attachments between said set of email clients is capable of detecting the state of an attachment and sharing a reference pointer to said attachment depending upon the state of said attachment.

Other features and aspects of the present system are presented below in the Detailed Description when read in connection with the drawings presented within this application.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION

Figure 1:
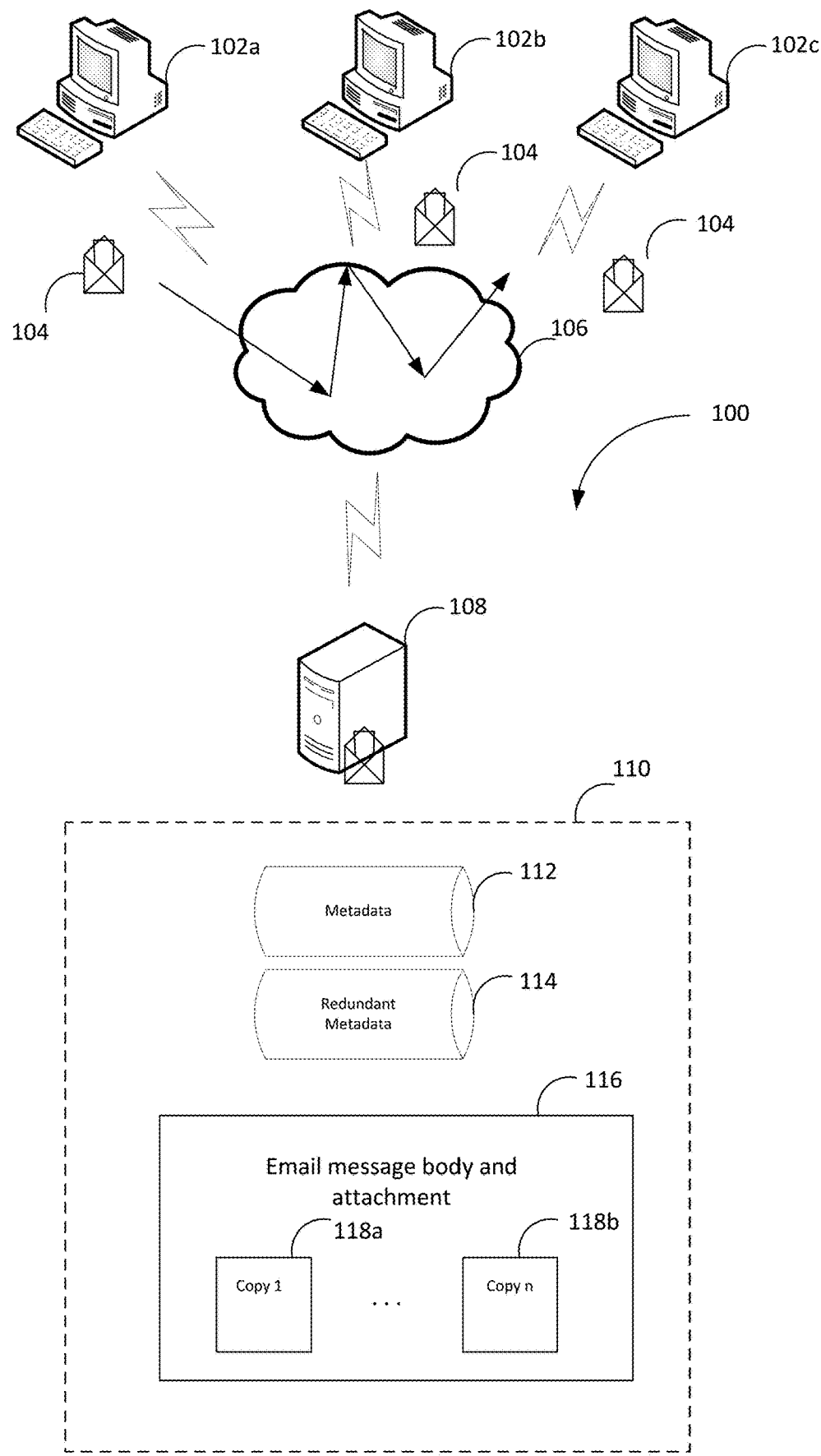
FIG. 1 depicts one exemplary computing and/or networked environment in which various embodiment of the present application might operate and persist in accordance with the principles of the present application.

As utilized herein, terms "component," "system," "interface," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

INTRODUCTION

In the interest of saving space, processing time and overall cost of a file system, database, email system or the like, it may be desirable to implement a system that may effectively manage the de-duplication of files ("blobs") across the entire system. Such a system may also be concerned with notions such as data security, data recovery and data integrity, among others.

FIG. 1 is one example of a computing/networking environment (100) in which embodiments of the present application may operate and reside. Although FIG. 1 is depicted in the form of an email system, the principles of the present application may able with equal force in the applications of database management or file system management as well.

In the environment 100, there may be a plurality of email clients 102a, 102b, and 102c. In this example, client 102a writes an email 104 with attachment and sends it into the networked system 106, destined for another client 102b. Client 102b, in turn, may decide to forward the email with the attachment to a third client 102c.

Within the networked system 106, there may exist an email server 108, together possibly with a number of other servers, routers and other network components that are known in the art. For example, in the design of Microsoft Outlook® email system, the system ensures that the copies of data reside on independent hard drives, controllers, and machines. This kind of system is nicknamed "JBOD," which stands for "Just a Bunch Of Disks." In a JBOD system, the hard drive controller attempts to get out of the way, which means that the software is more concerned about the failures that the controller previously handled. These failures may range from firmware bugs on the hard drives themselves to issues such as "unrecoverable read errors" that previously were automatically fixed by the controllers. In addition, the software may now scrub the drives periodically to check the data for "bit rot" (i.e., data that has for some reason become unreadable or corrupt). In this case, it is possible to build a distributed "RAID" controller completely in software, which replaces the industry-standard firmware ones.

The software for such a JBOD system may monitor the hard drives schedules repair actions, detects failures, and diagnoses repairs. This software may also comprise a number of "watchdogs" that constantly monitor for certain types of failures. If the watchdog detects the failure that it is looking for, it raises an alert, which may automatically trigger a repair process. This repair process may range from rebooting a machine or restarting a process, to fixing data corruption or even involving a human if progress can't be made.

As a part (110) of the overall system, metadata 112 and redundant metadata 114 may be employed so that the software may also know exactly how many good copies (e.g. 118a and 118b) of an email message to which the system has access (in, 116, for example). In the case where it finds that there are too few copies, it may prioritize repair actions to avoid a potentially dangerous situation. In situations where repairs are taking too long, it is possible to move data to another location altogether.

The system may effectively manage and store replicated email messages by storing original email messages in exactly the same as they were when they were delivered. Data about email messages that changes (such as read/unread, location in a folder, etc.) is stored separately—e.g., in metadata store 112.

The system may comprise a set of machines, each of which may have its copy of an email message and a journal recording messages that have arrived, organized by arrival date. The machines may talk to each other from time to time, compare their journals, and copy any messages that they realize haven't been copied to all machines. This can happen for a variety of reasons, mostly due to machine, network, or hard drive failures. In some cases, the journals are too far out of sync, in which case the system does a full comparison/copy.

Although hard drives have gotten bigger and cheaper, the speed at which they can retrieve data hasn't changed much. This means that although hard drives may pack more data on larger hard drives, the hard drives would eventually be unable to handle the rate of requests. One technology that is promising in this area is Flash Storage (also called SSD, or Solid State Drive). SSDs use technology similar to what you'd find on an SD card or USB stick, but with a faster internal chipset and a much longer lifespan. A normal hard drive can perform a little more than one hundred read/write operations per second, whereas some of the fastest SSDs can do over one hundred thousand operations per second. However, this comes at a price, as these devices may be 10 to 100 times more expensive than hard drives when you look at what you pay per gigabyte of storage.

In storing the email messages, the system may also keep track information about these messages (metadata 112), such as the list of messages in your folders, read/unread status of your messages, conversation threading, mobile phone synchronization etc. This metadata tends to take up an extremely small fraction of our total storage space, but due to its constantly changing nature, it may consume a good share of the load on the hard drives.

By using SSDs for this small and rapidly changing set of data, and using the largest hard drives available for storing messages, the system may be able to take advantage of the trend in larger and cheaper hard drives without making any sacrifices in the performance of our system.

In one embodiment, the system—upon file and/or message delivery—may detect if the file and/or message is greater than a given threshold size (say, Y), or if the file and/or message has an attachment(s) (say, X), greater than a given threshold size (say, Y). If so, then the system may check to see if the exact file, message or attachment(s) X has already been delivered to, shared by (or stored by) a user on the system. To check to see if the file, message and/or attachment has been delivered and/or shared with a user on the system, the system may perform a hash function upon the file, message and/or attachment and compare previous hash results for a match. In addition, the system may store and/or retain metadata regarding the file, email message and/or attachment, including: state metadata, metadata regarding how and/or with whom sharing and/or duplication may have occurred.

If the file, message and/or attachment has been delivered, shared—and the 'blob' is in a good state and there are no more than another threshold number (say, Z) of references and/or links to X already, then increase the reference count to that blob and 'point' to that blob for the new message delivery, not saving X again on the file-system. During this process, the system may also detect if the 'blob' on disk is corrupted and, if so, either repair or replace with the good X. For example, in the context of FIG. 1, when client 102b forwards email 104 with the same attachment to another target client and/or entity, then the system may forward a pointer reference to the attachment without creating another duplicate of the attachment.

It will be appreciated that other systems—such as databases, email system and/or other file systems—may have architectures that differ from the one described in reference to FIG. 1; but the techniques of the present application may also benefit other such architectures.

De-Duplication Embodiments

In the context of an email system (merely for exemplary purposes), one embodiment of the system may be designed to identify duplicated attachments, upon mail delivery, and de-duplicate them on a file-store; thereby possibly achieving disk savings of 34% or more and I/O and network bandwidth savings. In addition to uniquely identifying attachments, the systems may incorporate understanding the life-cycle of a 'blob', how to perform re-replication of 'blobs' from other source machines or disk drives if a 'blob' becomes lost or corrupted, and perform hot-spot 'blob' management to ensure efficiency of storage and I/O for the file-system.

In many email systems, it is noted that a large proportion of the content comprises a small set of large attachments, which are stored across many email accounts. From this observation, other embodiments of the present application desire to take advantage by allowing these attachments to be stored once (or a limited number of times) and shared within or across a plurality of accounts. In one embodiment, the system may extract attachments out of message files and stored separately so that they can be referenced and tracked independently of the account they originated from.

Other embodiments of the present application may comprise modules to affect:
 (1) Finding duplicates: a module to affect an index mechanism that allows for newly delivered content to be identified as a candidate for de-duplication and for existing duplicates to be located and taken advantage of.
 (2) Maintaining duplicates: a module to repair and maintain our de-duplicated data in the face of hard drive failures and data corruption, and in other embodiments, being especially careful since the loss of a single de-duplicated blob could affect many accounts.
 (3) Garbage collection: a module to safely remove attachments that are no longer referenced.

In some embodiments, it is possible to choose the scope of de-duplication to coincide with the scope of a single SQL database. In such a case, duplicate blobs may be discovered that are referenced by accounts that are stored within the same SQL database. In such embodiments, such a scope may allow the system to achieve space savings, while at the same time simplifying duplicate discovery and garbage collection. In some embodiments, it may be possible in some embodiments to allow multiple copies of the same duplicate to be stored on different disk groupings in order to limit the amount of damage that could be caused by the loss of a single attachment.

Identification and Management of Email Parts/Attachments

In one embodiment, a module for identifying the various email parts may be desirable to detect and/or identify those parts (e.g. attachments, etc.) as possibly being subject to de-duplication. In another aspect of an identification module, this module may also discern and/or successfully identifying attachments that may already been shredded for the same or another individual and having multiple accounts point to the same shredded attachment without privacy or data corruption concerns. For example, a cryptographic hash may be used to make uniqueness between attachments.

Additionally, in the case where a de-duped attachment already exists on disk, it may no longer be desirable to write the attachment to disk, but the system may simply increment a refcount, and save disk space, IO, and network bandwidth by not re-writing it. It may be desirable for the module to pay attention to, and track, the life-cycle of blobs. More specifically, the module may track a blob through the various states a shredded attachment may take, such as when to delete it, decrement/increment the reference to it, or replace it. Automated re-replication from other source machines/disks may be desirable, if a blob is lost and/or corrupted. In addition, some more techniques may be desirable such as the recovery of lost meta-data and bringing the store back to consistency, automatically; the prioritization of which attachment to increment the ref-count (as explained herein); and having a spill over mechanism to reduce hot spots when references are popular.

Towards the identification of attachments and other objects that might comprise a blob, some embodiment may make this identification at the MIME parts boundary. In this embodiment, there may be a plurality of representations of messages that are used/recognized by the systems:
 (1) "Literal MIME": This may be just the MIME message as it was received via SMTP. Attachments may be included as base64 or binary encoded streams.
 (2) "Compressed MIME" or "V1": This may be the literal MIME format compressed via Xpress.
 (3) "AttachStore" message format: This may be a container that has the extracted the attachments and placed them separately at the end of the file.

In one embodiment, it may be desirable to enhance the "AttachStore" format to support pointers to blobs that are stored as separate files on disk. In such an embodiment, it may be possible to make changes in the AttachStore as follows:
 (1) A blobId and a hash may be stored in the ATTACHMENT_LIST_NODE.
 (2) A complete file CRC may be stored at the end of the file to simplify CRC validation.

In addition, blobs may be stored in a separate directory structure on the file-system, parallel to where messages may be stored as follows: msg, index, ptf, blob (first 2-characters of hash; attachment hash).

In one embodiment, it may be desirable to store blob files not as a single large directory, as that may result in a severely fragmented directory file once it reaches a large number of entries. So, in one embodiment, it may be desirable to use the first two characters of a hash as the directory name and then limit the number of files per directory to desired number—e.g., a few thousand.

This embodiment, moreover, may implement de-duplication at the machine/db level. This approach may be applicable directly at a larger scale—e.g., a group of machines or even an entire data center (DC). Individual de-duplicated blobs found to be corrupt may then be recovered from other copies existing within the local or even in a remote DC. Exceptional handling may be made for the recovering after catastrophic data failures.

One State Diagram Embodiment

During their lifetime, blobs will tend to transition to various states as they are created, corrupted, fixed and deleted. This observation may lead to one embodiment that employs a state-transition approach that describes the life-cycle of a blob. The states may determine which APIs can be applied to (or used against) a blob and may be used to make sure that various tasks do not step on each other. Alternatively, another embodiment might rely on reference counts to manage blobs; but states may be desirable to use as there may be different interpretations of a reference count of 0; and they may be treated differently.

Figure 2:
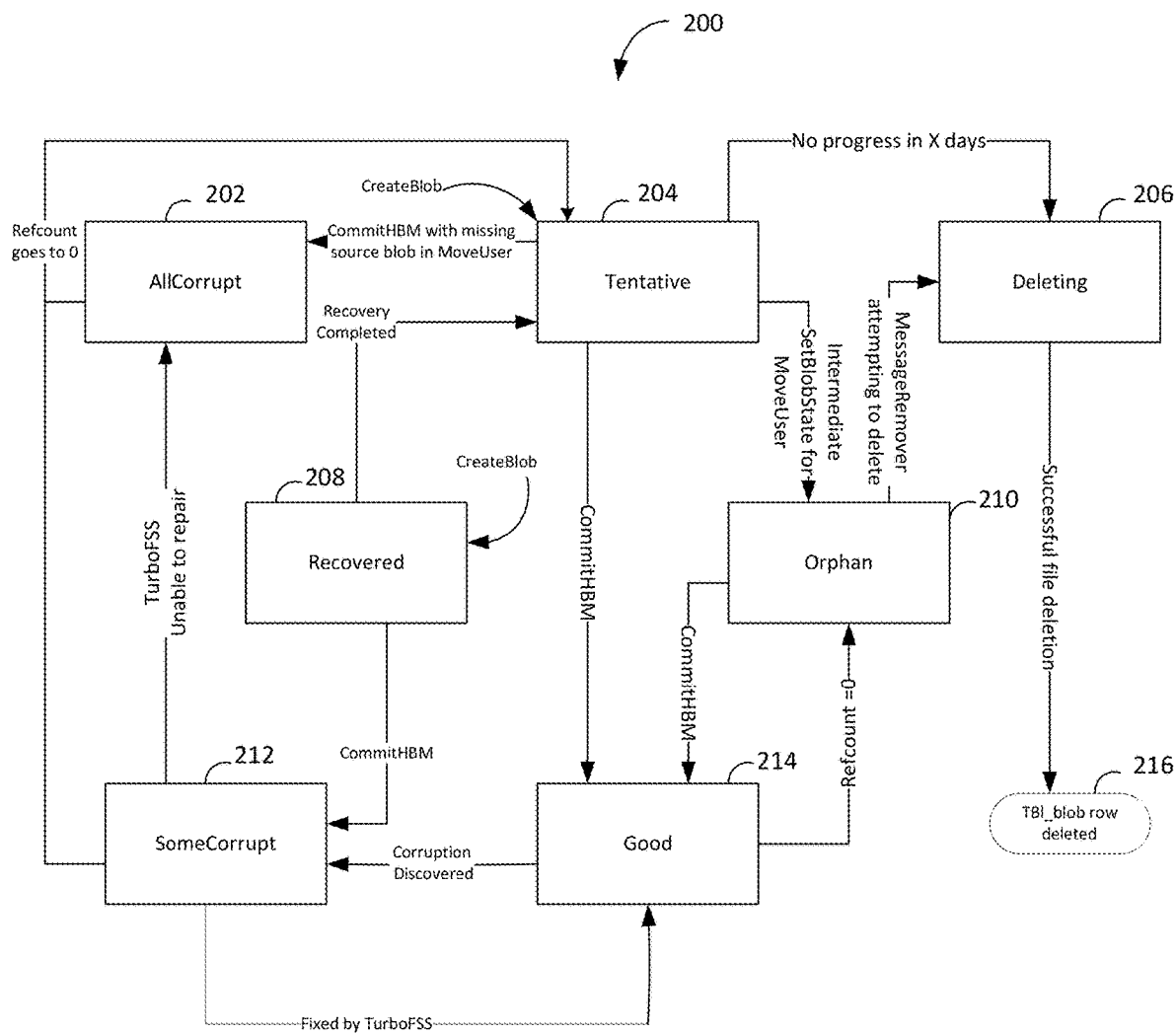
FIG. 2 is one embodiment of a state table/flowchart of a blob management system as made in accordance with the principles of the present application.

In another embodiment, the system may affect a state diagram (200), such as shown in FIG. 2. System 200 may comprise a plurality of states—e.g., AllCorrupt 202, Tentative 204, Deleting 206, Recovered 208, Orphan 210, SomeCorrupt 212, Good 214 and Tbl-blob row deleted 216—as explained herein. As mentioned, the system may maintain a counter of the number of pointers (i.e. "Refcount") to a blob (possibly in metadata store). If all blobs are designated as "corrupt" then the state data may reflect one of two states—(1) Tentative, if Refcount=0 or (2) AllCorrupt, if Refcount>0. The system may send the request for storage and/or access to Tentative 204.

If desired, the system may CreateBlob at the Tentative state 204—in which case the blob is "committed" to store (e.g. "HBM") and the system may transfer to Good state 214. In one embodiment, it may be desirable to commit blob to store only after the blob has been physically written to all of the replicas. The following is a description of the various states employed:

Good State

This is the normal state for a blob. It can be AddRef'd during delivery of a new message and will not be garbage collected. In one embodiment, AddRef may indicate that a blob may be reused. If the blob has already been delivered and is in this state, then the blob "already exists", and additional references to it may lead to incrementing its reference count (i.e. without storing it again) and updating the pointers for proper reuse of the blob.

Good blobs may have a soft limit on the number of references, which may cause additional copies of the blob to be created.

Orphan State

This is a blob which may no longer have active references and may be a candidate for removal by Message Remover. Until it is actually put into the Deleting state, it may be AddRef'd and go back into a Good state.

Like the Tentative state, after a period of a desired time period, Message Remover will delete these blobs.

Recovered State

It may be desirable to reconstruct "tbl_blob" from disk in the case of database corruption, or loss of the recent transaction log. In one embodiment, tbl_blob may be the data structure that holds information about the location and state of each blob. If this table and/or data structure is lost, then it may be desirable to recover the data in any fashion known in the art for data recovery. In order to facilitate this, there is a state called "Recovered", which is similar to Orphan. Since Recovered blobs may not have been validated yet, the system should monitor recovered blobs before reusing them either via delivery or for recovered messages. For any AddRef, if a blob is found in the Recovered state, the mail delivery may rewrite the blobs to ensure that all copies are not corrupted.

Database recovery may have the option of either reusing the blob in SomeCorrupt state without verifying, or verifying the integrity and committing it as Good. In some case, database recovery may not be able to verify the integrity of all copies of blob, such as when a share is down. Once recovery is completed, any remaining blobs may be moved to the Tentative state, since it may not be desirable to reuse a blob without getting the blob validated/rewritten first. Garbage collection may not be performed on recovered blobs. It may be made the responsibility of the database recovery process to clean up once completed. AddRef OK only after verifying validity.

Tentative State

The "Tentative" state may be used by processes that write new blobs to disk. Since a blob-write may fail due to network errors, transient errors, etc., it may be desirable to remember where these blobs have been written so that they may be cleaned up, if the blobs were left behind and/or never used. For safety's sake, blobs may be suitable for use by de-duplication if all copies are written successfully. In these cases, if a tentative blob with full redundancy was failed to be written, it may be possible to fall back to writing the message in the complete format. The expectation is that callers will first create a blob in a Tentative state, then call Torres to write the file to all shares, and then transition the blob via CommitHeaderBlobMapping (Commit_HBM) or by setting the state to Orphan. In one embodiment, Commit_HBM may be an internal function call that moves the blob state in the metadata store from the Tentative state to the appropriate new state (in which case, the blob may be ready to used and re-used). In addition, Commit_HBM may increment the Refcount for the blob—for example, a Commit_HBM call on a blob in Tentative state may not only change its state, but may also increment Refcount to 1.

If a blob already exists in a Tentative state, there is the potential for a race-condition if another blob is delivered at the same time. This condition is dealt with by Torres, which will ensure that writing blobs never destroys existing data. (See section on Torres for full description)

Deleting State

Once Message Remover decides to actually delete the file on disk, it will mark the blob as "Deleting" before starting the delete operation. This will ensure that no one will attempt to use a half deleted blob. Once confirmation is received that all copies have been deleted from disk, the row is removed from tbl_blob. If an error occurs, it may be desirable to stay in this state until deletion is confirmed (either because the file does not exist anymore or it is deleted).

If a blob is in a Deleting state and a caller attempts to create a new blob with the same hash, a different database group will be chosen for the new blob. AddRef—NOT OK.

SomeCorrupt State

If any copies of a blob are detected as corrupt or unreadable, the system may mark the blob as "SomeCorrupt"—or some other named "corrupt" state. It is desirable that the system does not store information about which replica is corrupt. This is both a signal to a module for detecting corrupt blobs, and/or repairing corrupt blobs (aka "TurboFSS"). This module may periodically query for corrupt blobs. This module may also attempt repair, in addition to making this blob unavailable for any new deliveries. As the system may not know the exact state of the blob (only that there's something wrong), the system may not use the blob for de-duping. For purposes of this application, TurboFSS refers to a module that makes sure files and blobs are kept in sync among multiple redundant copies in the system.

TurboFSS may also consider the last Write time of the blob when performing repairs to avoid attempting the repair too many times. If a blob reaches refcount 0, it may go to the Tentative state, since it may be desirable to have the blob rewritten before the blob is reused. If a new blob arrives with the same hash as an existing blob in SomeCorrupt, the system may overwrite it with the new delivery. If all writes are successful, then the blob may be marked repaired. Blobs that are partially redundant because a share was down during delivery or moveuser are not put into the SomeCorrupt state, since the system may not de-duplicated if all blobs could not be written with full redundancy. AddRef NOT OK.

AllCorrupt State

This state indicates that data-loss has occurred for a given blob and that all repair attempts have failed. Further attempts at repair may not be attempted. Blobs may stay in this state forever until manually repaired or all reference count reaches 0 and they are deleted.

Since MoveUser may move entire accounts (including missing blobs), AllCorrupt blobs may be created on the destination system by MoveUser if the blob was completely missing on the source system. If a blob is in this state reaches a refcount of 0, it may goes to Tentative, since it may be desirable to have the blob validated and/or rewritten before getting reused. For purposes of this application, MoveUser is a module that moves email accounts around an intra- and interdata center for optimal balancing with the file system or email system or the like.

In one embodiment, blobs in this state may stay in the database while some user and/or entity is referencing them. In some embodiments, there may be a plurality of techniques for the repair of such blobs, including:
 (1) Mail delivery or MoveUser may repair an existing blob if a new blob with the same hash is delivered.
 (2) Look on other servers or database groups to see if the attachment exists there.
 (3) For users that use ActiveSync, the system may pull the attachment from there.

If a new blob arrives with the same hash as an existing blob in AllCorrupt, one embodiment may overwrite it with the new delivery, since persistent storage may be guaranteed to be idempotent with writes. If all writes are successful, then the blob will be marked Good and then AddRef'd. Addref NOT OK.

Reference Counting

Since blobs may be shared between users, it may be desirable to track the number of references a blob has so that the system may clean it up when it reaches zero references. Alternatively, the system may potentially prevent a blob from having too many references if it is desirable to mitigate data loss that may affect a desired threshold number of accounts.

The state of a blob may also have an effect on the reference count, since certain states desire the reference count to be 0 and others desire it to be greater than 0. For example, the following table reflects one embodiment's implementation:

|  | All-Corrupt | Some-Corrupt | Deleting | Tentative | Good | Orphan | Recovered |
|---|---|---|---|---|---|---|---|
| Ref Count | >0 | >0 | =0 | =0 | >0 | =0 | =0 |

Reference counts may be incremented when rows are added to tbl_HeaderBlobMapping (i.e., tbl_HBM) and may be decremented when rows are removed. Rows may be removed from tbl_HeaderBlobMapping when the message is removed from tbl_deletedmessage. It may be desirable to that the system does not remove on the deletion from tbl_header, as that this may cause blobs to get garbage collected before their messages are deleted by Message Remover. In one embodiment, if the system desires to revert message remover for some reason, it may be desirable to ensure that the attachments can still be read.

When the reference count reaches 0, the trigger may change the state in the tbl_blob table in the following way:

| New\Old State | AllCorrupt | SomeCorrupt | Deleting | Tentative | Good | Orphan | Recovered |
|---|---|---|---|---|---|---|---|
| New State when Ref Count = 0 | Tentative | Tentative | Already 0 | Already 0 | Orphan | Already 0 | Already 0 |

Blobs that are partially or fully corrupt may transition to the Tentative state so that the system may not attempt to repair them.

In one embodiment, the system may enforce a soft limit on reference counts to limit the amount of damage that loss of the copies of a blob may have. This limit may be read from a configuration file and may be enforced when CreateBlob is called. If the system notices that a blob is over the configured limit, the system may return a new Tentative blob at a new location rather than returning an existing blob. For the purposes of this application, CreateBlob is a function call that may either create a new blob location or reuse an existing location.

In some embodiments, the limit may be enforced logarithmically, so that each additional copy may multiply the number of blobs by the limit. For example, if the limit is 100 copies per blob, two copies would allow 100*100=10000 copies and three copies would allow 100^3 copies.

The following table is one embodiment of possible blob repair states under a number of different conditions:

| Repair of blob states | | | | | |
|---|---|---|---|---|---|
| Email message | Blob | Email -> Blob connection | Message | Blob | Recoverable by |
| MISSING | GOOD | GOOD | GOOD | GOOD | Reading the message file and redelivering it |
| GOOD | MISSING | GOOD | GOOD | GOOD | Both from Email -> Blob connection and the blob on disk |
| GOOD | GOOD | MISSING | GOOD | GOOD | The system may commit an entry in Email -> Blob connection when the attachment header is read in the message file |
| MISSING | MISSING | GOOD | GOOD | GOOD | Header is recovered by redelivering the message. Blob entry can be recovered from the blob file |
| MISSING | GOOD | MISSING | GOOD | GOOD | Email -> Blob connection entry will be recovered by the attachment header in the message file |
| GOOD | MISSING | MISSING | GOOD | GOOD | Email -> Blob connection entry as above. Blob entry will be recovered by the repair script and FS and reference count fixed by repair script |
| MISSING | MISSING | MISSING | GOOD | GOOD | Email message and Email -> Blob connection entries can be recovered by the message file. Blob entries can be recovered from the blob |
| MISSING | GOOD | GOOD | MISSING | GOOD | The system may not notice this because there may not be a consistency check between Email message and Email -> Blob connection |
| GOOD | MISSING | GOOD | MISSING | GOOD | Recovered by repair script |
| GOOD | GOOD | MISSING | MISSING | GOOD | The system may not be able to recover the Email -> Blob connection entry |
| MISSING | MISSING | GOOD | MISSING | GOOD | The system may only recover the Blob entry |
| MISSING | GOOD | MISSING | MISSING | GOOD | The system may not recover here |
| GOOD | MISSING | MISSING | MISSING | GOOD | The system may only recover Blob but reference count will be incorrect |

Repair of blob states

| Email message | Blob | Email -> Blob connection | Message | Blob | Recoverable by |
|---|---|---|---|---|---|
| MISSING | MISSING | MISSING | MISSING | GOOD | As above |
| MISSING | GOOD | GOOD | GOOD | MISSING | The system may recreate the Email message entry by redelivering the message |
| GOOD | MISSING | GOOD | GOOD | MISSING | The system may recreate the Blob entry to some extent |
| GOOD | GOOD | MISSING | GOOD | MISSING | Email -> Blob connection entry will be recreated from the attachments header in the message file |
| MISSING | MISSING | GOOD | GOOD | MISSING | The system may recreate from Email -> Blob connection and the message file |
| MISSING | GOOD | MISSING | GOOD | MISSING | The system may recreate from the redelivering the message file and the attachment header |
| GOOD | MISSING | MISSING | GOOD | MISSING | Yes, starts off as AllCorrupt |
| MISSING | MISSING | MISSING | GOOD | MISSING | As above but also with message redelivery |
| MISSING | GOOD | GOOD | MISSING | MISSING | The system may not check consistency between Email message and Email -> Blob connection |
| GOOD | MISSING | GOOD | MISSING | MISSING | Recover Blob entry from Email -> Blob connection |
| GOOD | GOOD | MISSING | MISSING | MISSING | Nothing the system may do |
| MISSING | MISSING | GOOD | MISSING | MISSING | Nothing the system may do other than Blob entry |
| MISSING | GOOD | MISSING | MISSING | MISSING | Nothing the system may do |
| GOOD | MISSING | MISSING | MISSING | MISSING | Nothing the system may do |

One Email System Embodiment

Figure 3:
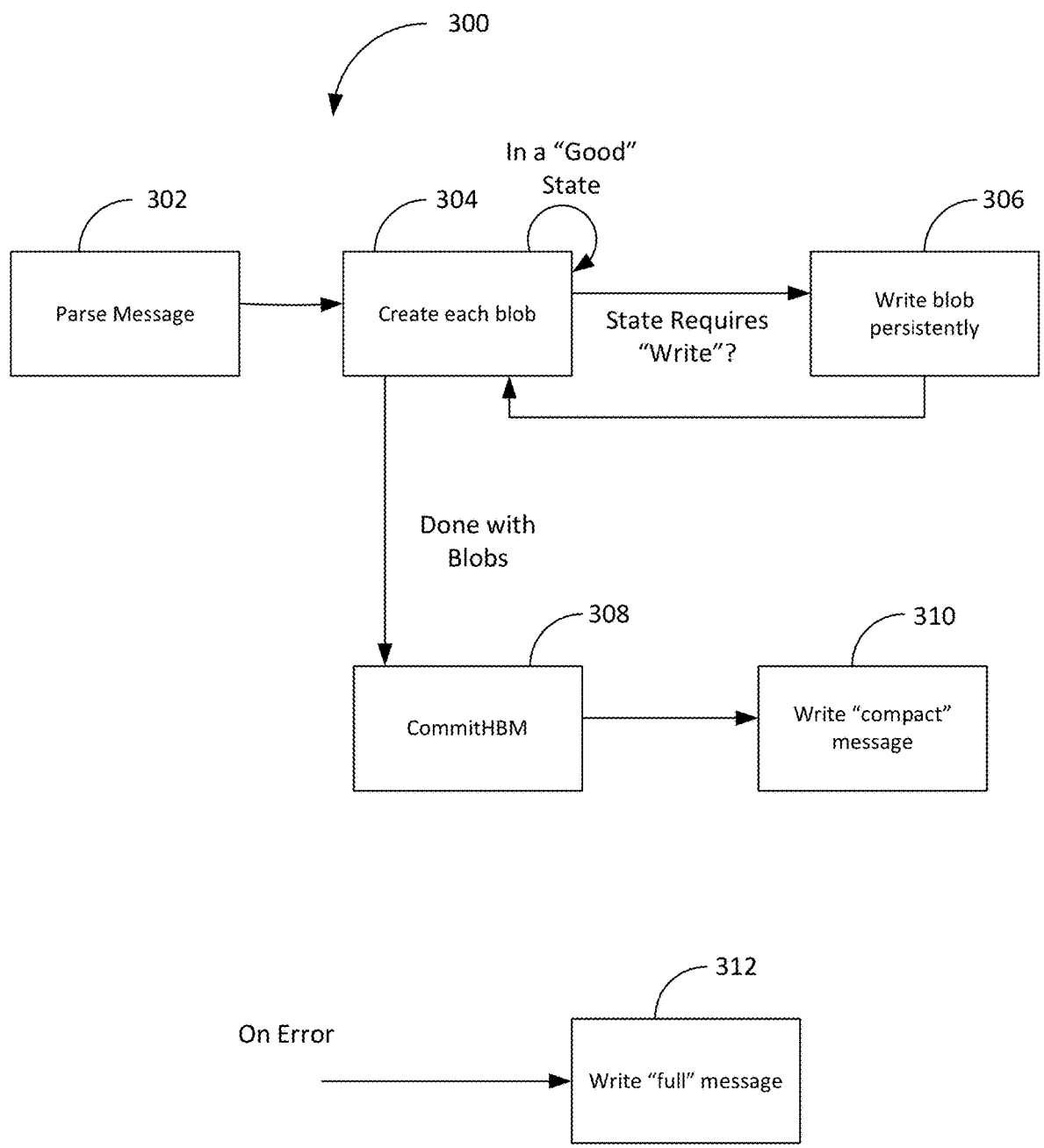
FIG. 3 is one embodiment of high level flowchart of an email delivery system and an associated blob management system as made in accordance with the principles of the present application.

FIG. 3 depicts one email system embodiment as made in accordance with the principles of the present application. In particular, system 300 depicts an email delivery flowchart diagram for de-duplication operations. Email system 300 may receive incoming emails and/or their attachments—and parse the various parts of the email at Parse Message 302. Parse Message 302 may calculate the hashes upon various parts. The hash results may be used by the system to aid in deciding whether to de-duplicate the message and/or the attachments.

The system may decide to Create Each Blob 304 and continue while in the "Good" State, as shown. If the state of the blob desires a "write", then the blob may be written to persistent store at 306. When the system is done with a blob, the system may engage CommitHBM at 308 and the system may thereafter write a "compact" message at 310. However, if the system detects an "error", the system may write the "full" message at 312.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

The invention claimed is:

1. A method for repairing data that is configured to be duplicated in a file system, said file system comprising one or more files, each said file comprising a set of data, the steps of said method comprising:
   receiving a file to be stored within a file system;
   determining whether a set of data within the file is greater than a threshold size;
   when it is determined that the set of data within the file is greater than the threshold size, checking whether the set of data within said file has been previously stored in said file system;
   if said set of data has been stored in said file system as one or more blobs, checking the state of the one or more blobs;
   determining that the state of at least one blob of the one or more blobs is a corrupt state;
   in response to determining that the state of the at least one of the one or more blobs is the corrupt state, checking a reference count associated with the at least one blob having the corrupt state;
   determining that the reference count is zero;
   in response to determining that the reference count is zero, transitioning the state of the at least one blob having a reference count of zero from the corrupt state to a tentative state; repairing the at least one blob in the tentative state when a new blob having a same hash as the at least one blob in the tentative state is received;
   determining that the state of at least one blob of the one or more blobs is a good state appropriate for sharing copies of said file;
   providing a reference to said at least one blob having the good state upon a command to share said stored set of data; and
   incrementing a reference count associated with said blob having the good state.

2. The method of claim 1 wherein said file system is one of a group, said group comprising: a database, a file system and an email system.

3. The method of claim 1 wherein said file system is an email system, said files comprise emails and said set of data comprises attachments to said emails.

4. The method of claim 3 wherein said step of receiving a file to be stored within a file system further comprises:
   receiving an email, said email further comprising an attachment.

5. The method of claim 4 wherein said step of receiving a file to be stored within a file system further comprises:
   storing metadata about said email, said metadata comprising one of a group, said group comprising: metadata regarding the email, metadata regarding an attachment to the email, state metadata regarding the email, state metadata regarding the attachment, metadata regarding how to share the attachment and metadata regarding duplication of said attachment.

6. The method of claim 4 wherein said step of checking whether a set of data within said file has been previously stored in said file system further comprises:
   performing a hash function on said set of data; and
   comparing the results of said hash function with results of previous hash results.

7. The method of claim 4 wherein said step of checking the state of the stored set of data further comprises: assigning a state associated with said attachment.

8. The method of claim 7 wherein said states associated with said attachment comprise one of a group, said group comprising: Good, SomeCorrupt, AllCorrupt, Tentative, Deleting, Orphan and Recovered.

9. The method of claim 7 wherein said step of: if said state of stored set of data is appropriate for sharing copies of said file, then providing a reference to said file upon a command to share said set of data further comprises:
   incrementing a reference count for said stored set of data; and
   sending to the target entity a pointer reference to said stored set of data.

10. The method of claim 1 wherein said method further comprises the step of:
    detecting if a set of data is corrupted; and
    if corrupted, transitioning the state associated with said set of data from good to corrupt.

11. The method of claim 10 wherein said method further comprises the step of:
    repairing said corrupt set of data; and
    transitioning the state associated with said set of data from corrupt to good.

12. A system for repairing data that is configured to be duplicated in an email system, said email system comprising:
    an email server, said email server in communication with a set of email clients;
    a database for storing emails and associated attachments as blobs; said database storing at least one of a group, said group comprising: the email message, associated attachments, metadata regarding the email message and metadata regarding said associated attachments;
    a module for managing the sharing of blobs between said set of email clients;
    wherein said module of managing the sharing of blobs between said set of email clients is configured to detect a state of a blob and share a reference pointer to said blob depending upon the state of said blob; and
    further wherein said module of managing the sharing of blobs between said set of email clients is configured to:
    determine whether a set of the associated attachments is greater than a threshold size;
    when it is determined that the set of the associated attachments is greater than the threshold size, check whether the set of the associated attachments has been previously stored in the email system;
    if the set of the associated attachments has been stored in the email system as one or more blobs, check the state of the one or more blobs;
    determine that the state of at least one blob of the one or more blobs is a corrupt state;
    in response to determining that the state of the at least one of the one or more blobs is the corrupt state, check a reference count associated with the at least one blob having the corrupt state;
    determine that the reference count is zero;

in response to determining that the reference count is zero, transition the state of the at least one blob having a reference count of zero from the corrupt state to a tentative state;

repair the at least one blob in the tentative state when a new blob having a same hash as the at least one blob in the tentative state is received;

determine that the state of at least one blob of the one or more blobs is a good state appropriate for sharing copies of the associated attachments;

provide a reference to said at least one blob having the good state upon a command to share said stored set of data; and increment a reference count associated with said blob having the good state.

13. The system of claim 12 wherein said module for managing the sharing of blobs further comprises a module for detecting whether a blob is corrupt.

14. The system of claim 13 wherein said module for managing the sharing of blobs further comprises a module for maintaining the state of a blob.

15. The system of claim 14 wherein said module for managing the sharing of blobs further comprises a module for repairing a corrupt blob.

16. The system of claim 15 wherein said module for managing the sharing of blobs further comprises a module for removing blobs that are no longer referenced by email clients.

17. The system of claim 16 wherein said module for managing the sharing of blobs further comprises a module for transition the state of an blob depending upon the detected state of said blob.

18. A computer readable I/O storage medium that is not a transient signal, said computer readable storage medium having computer-executable instructions stored thereon that, when executed by a processor, cause said processor to execute: repairing data that is configured to be duplicated in a file system, said file system comprising one or more files, each said file comprising a set of data, the steps of said method comprising:

receiving a file to be stored within a file system;

determining whether a set of data within the file is greater than a threshold size;

when it is determined that the set of data within the file is greater than the threshold size, checking whether the set of data within said file has been previously stored in said file system;

if said set of data has been stored in said file system as one or more blobs, checking the state of the one or more blobs;

determining that the state of at least one blob of the one or more blobs is a corrupt state;

in response to determining that the state of the at least one of the one or more blobs is the corrupt state, checking a reference count associated with the at least one blob having the corrupt state;

determining that the reference count is zero;

in response to determining that the reference count is zero, transitioning the state of the at least one blob having a reference count of zero from the corrupt state to a tentative state;

repairing the at least one blob in the tentative state when a new blob having a same hash as the at least one blob in the tentative state is received;

determining that the state of at least one blob of the one or more blobs is a good state appropriate for sharing copies of said file;

providing a reference to said at least one blob having the good state upon a command to share said stored set of data; and incrementing a reference count associated with said blob having the good state.

19. The computer readable storage medium of claim 18 wherein said step of checking whether a set of data within said file has been previously stored in said file system further comprises:

performing a hash function on said set of data; and comparing the results of said hash function with results of previous hash results.

20. The computer readable medium of claim 19 wherein said step of:

if said state of stored set of data is appropriate for sharing copies of said file, then providing a reference to said file upon a command to share said set of data further comprises:

incrementing a reference count for said stored set of data; and sending to the target entity a pointer reference to said stored set of data.

\* \* \* \* \*